Feb. 14, 1939.  A. T. SMITH  2,147,319
ELECTRIC CULINARY APPLIANCE
Filed June 24, 1937  2 Sheets-Sheet 1

INVENTOR
ALVA T. SMITH
BY
ATTORNEYS

Feb. 14, 1939.     A. T. SMITH     2,147,319
ELECTRIC CULINARY APPLIANCE
Filed June 24, 1937     2 Sheets-Sheet 2

INVENTOR
ALVA T. SMITH
BY

ATTORNEYS

Patented Feb. 14, 1939

2,147,319

UNITED STATES PATENT OFFICE 2,147,319

ELECTRIC CULINARY APPLIANCE

Alva T. Smith, Milwaukee, Wis., assignor to National Enameling and Stamping Company, Milwaukee, Wis.

Application June 24, 1937, Serial No. 150,064

8 Claims. (Cl. 219—43)

This invention pertains to electric culinary appliances, and more particularly to an apparatus convertible for various styles of cooking, such as baking, roasting, frying, steaming, and the like.

The invention has primarily for its object to provide an exceedingly simple, inexpensive, and efficient appliance of the foregoing character, which may be readily converted with minimum effort, easily cleaned, and replenished with new heating elements when required.

Incidental to the foregoing, a more specific object resides in the provision of a thermostatically controlled heating base, upon which various parts may be assembled in arbitrary arrangement to perform different styles of cooking.

Another object resides in the provision of quickly detachable heating elements, thus facilitating repair or replacement of the heating units when the same are damaged, or become deteriorated beyond a desired stage of efficiency.

Another object resides in the provision of a thermostat for controlling the heating circuit, so arranged in the base with relation to the heating elements as to be protected, and at the same time be influenced by the heating elements to accurately control the cooking temperatures, regardless of the style of cooking being performed, or the selected arrangement of parts of the apparatus.

A still further object consists in the novel arrangement of the inner receptacle with relation to the base and spaced insulating shell which supports the receptacle above the base to form a surrounding heating compartment, either vented or closed, the inner wall of the insulating shell having a heat-reflecting surface which materially increases the efficiency of the appliance, when employed in that style of cooking requiring the insulating shell.

Another object is to provide the base and insulating shell with cooperating handles to facilitate handling, either individually or as a unit.

With the above and other objects in view, which will appear as the description proceeds, the invention resides in the novel construction, combination, and arrangement of parts, substantially as hereinafter described, and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

Figure 1:
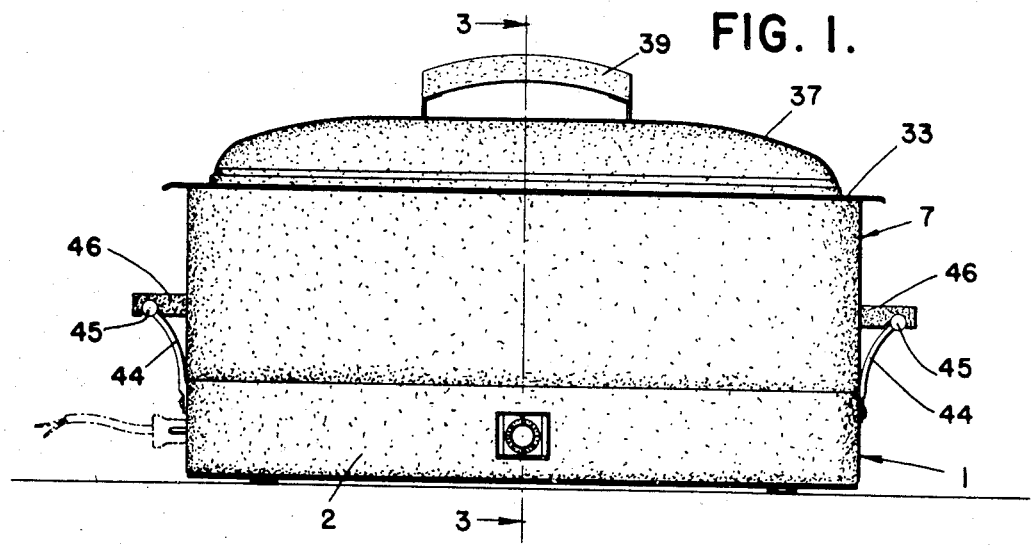
Figure 1 is a front elevation of an appliance constructed in accordance with one form of the present invention.

Referring now more particularly to the accompanying drawings, the numeral 1 designates generally a hollow base, consisting of an upper section 2, comprising integral top and side walls, and a detachable bottom 3 attached to the upper section by tie-bolts 4. The top of the upper section is provided with a raised peripheral rib 5, spaced inwardly from the side wall 2 to form a supporting shoulder 6 for reception of an insulating shell 7. The inner side of the bead 5 terminates in a general depression 8, which is further provided with individual depressions 9 for the reception of the electrical heating elements 10. The bottom 3 has indentures 11 formed therein for reception of the cushion feet 12.

Positioned within the base, and attached to the lower face of the top of the upper section 2, between the depressions 9, is a thermostatic element 13, connected in the heating circuit for controlling the same to regulate the cooking temperatures. The thermostat 13 is adjusted by means of a graduated thumb dial 14, mounted on the side wall of the upper section 2, and connected with the thermostat by a rod 15.

Figure 2:
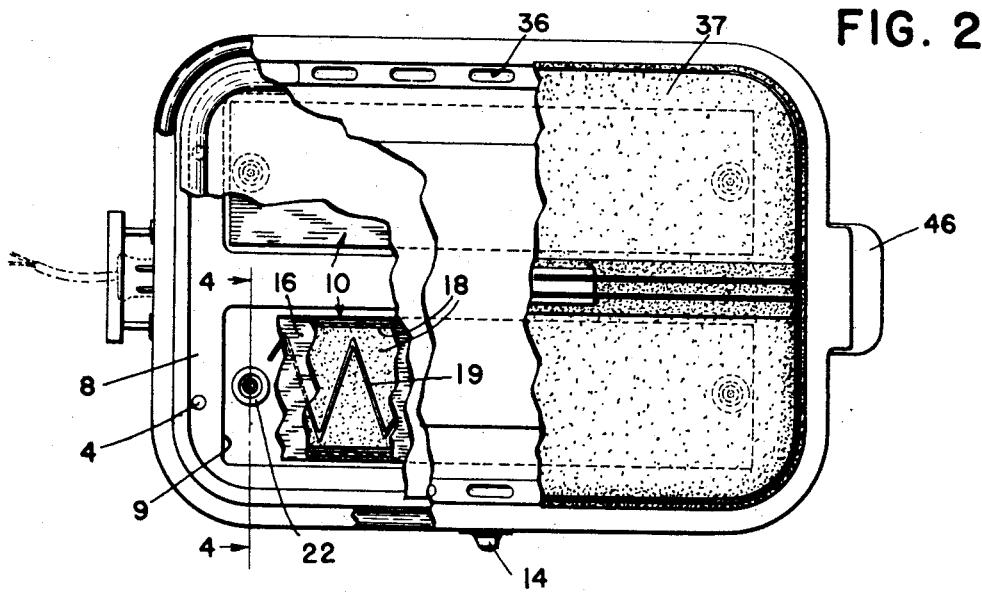
Figure 2 is a plan view, with parts broken away to more clearly illustrate structural features.
Figure 5:
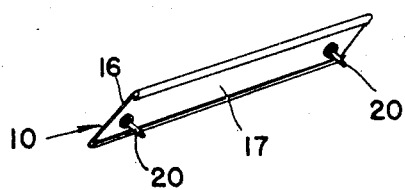
Figure 5 is a perspective view of one of the electrical heating elements.
Figure 4:
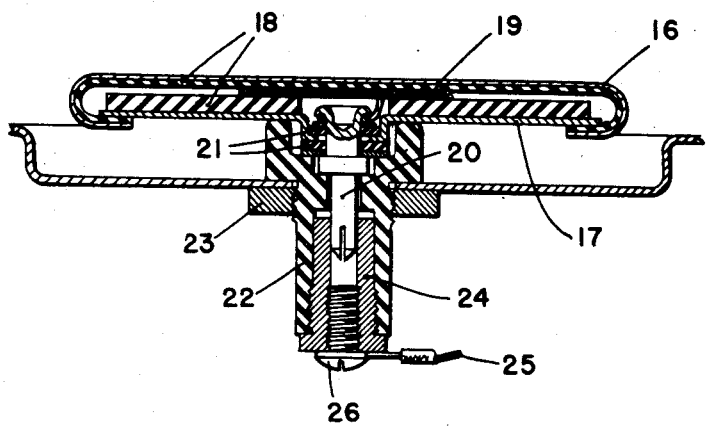
Figure 4 is a fragmentary detail section taken on the line 4—4 of Figure 2.
Figure 4:

One of the salient features of the invention resides in the quick detachability of the electrical heating elements 10, which is accomplished by novel prong and socket connections. As best shown in Figures 2 and 4, the elements 10 are preferably of elongated rectangular shape, conforming to the depressions 9, and comprising spaced upper and lower plates 16 and 17, respectively, the longitudinal edges of the upper plates being folded over to form lapped joints with the lower plates 17. Layers 18 of suitable insulating material are positioned between the plates 16 and 17, and resistance elements 19 are placed between the sheets 18. The ends of the resistance wires 19 are secured under the upset heads of the prongs 20 carried by the lower plates 17, and are suitably insulated from the same by means of washers 21.

For quick detachability of the elements 10, sockets 22 formed of insulating material are secured to the top of the upper section 2 by nuts 23 threaded exteriorly thereon. Each socket carries a metallic sleeve 24 for reception of a prong 20, and current is supplied to the sleeves 24 through the circuit wires 25 attached to the sleeves by screws 26.

Obviously, repair or replacement of the units 10 is readily accomplished by merely withdrawing the prongs from the sockets, and due to the fact that the units are comparatively inexpensive, they can be discarded and replaced upon deterioration at exceedingly low cost.

Figure 3:
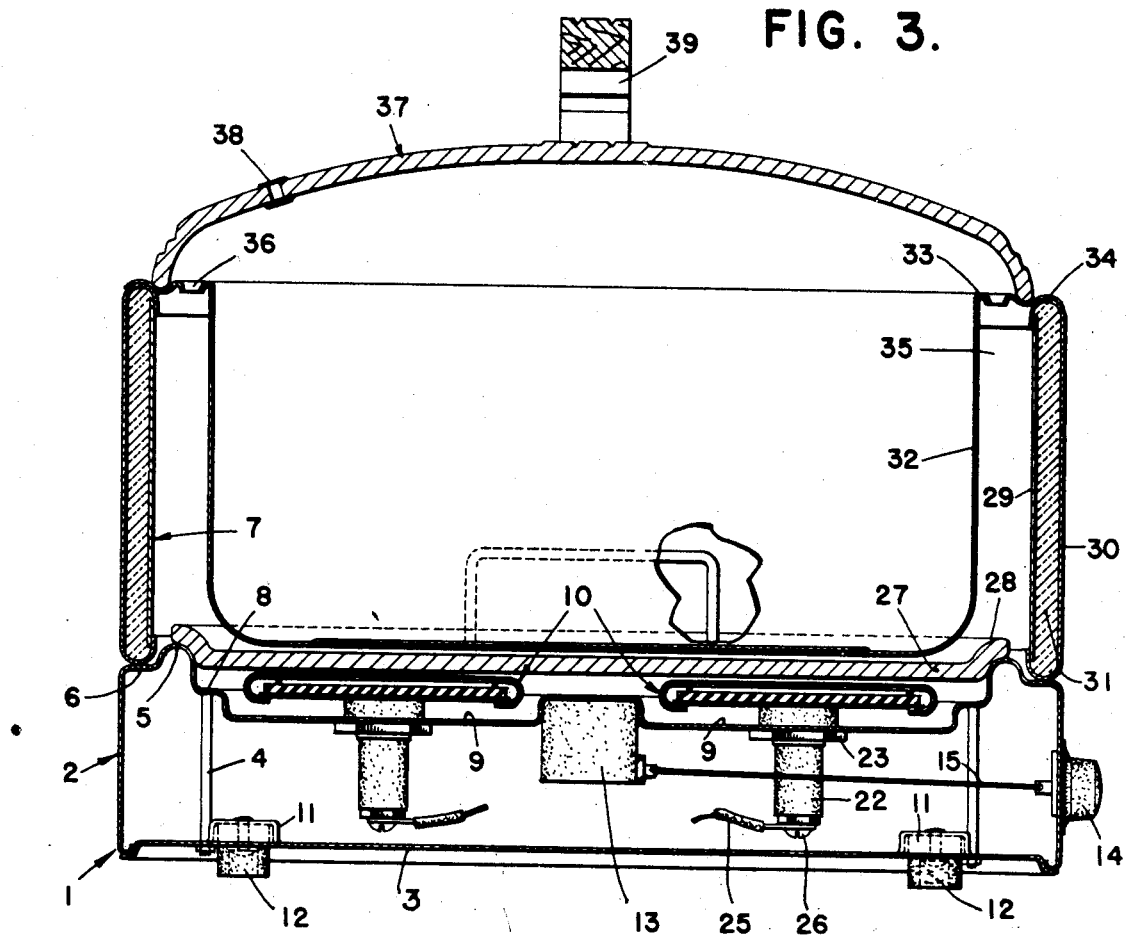
Figure 3 is a transverse section taken on the line 3—3 of Figure 1.

In instances where the appliance is to be utilized for frying and the like, a pan or plate 27 is employed, the same being provided with a raised peripheral edge 28, arcuate in shape, to seat upon the bead 5 of the upper section 2, as best shown in Figure 3.

The insulating shell 7, which is utilized in the various forms of cooking other than frying, consists of spaced inner and outer walls 29 and 30, respectively, the upper and lower edges of the outer wall being rolled over to engage the inner wall 7, and disposed between the walls is suitable heat insulation material 31, which insures maximum temperature within the shell.

Employed in connection with the shell 7 is an inner receptacle 32, provided at its upper edge with a peripheral flange 33, having an arcuate seat 34 adapted to engage the rounded upper edge of the shell 7 to form a heating compartment 35 entirely surrounding the side and bottom of the inner receptacle. While it is not essential to the present invention, in some instances the flange 33 may be provided with spaced fins 36 to allow heat from the compartment 35 to engage the cover 37 seated on the flange 36, and prevent condensation of humidity created during the cooking operation within the receptacle 32, particularly in baking, or when it is desired to brown the food.

The cover 37 is preferably cast of aluminum, and of sufficient weight to maintain a relatively low vapor pressure within the receptacle 32, should the same be used for steaming, or low-pressure cooking. Excessive pressure is relieved through a vent 38 provided in the cover, which also has a handle 39 of low heat conductivity. It will also be noted in Figure 3 that the peripheral edge of the cover 37 is shaped to conform to the shoulder 6, and may be seated thereon should it be desired to cover the food when only the plate 27 is used.

While not essential to the invention, it has been found by actual tests that the efficiency of the appliance is materially increased by the provision of chromium-plated surfaces on both the inner wall 29 of the shell 7, and the upper faces of the depressions 9, inasmuch as they serve to reflect heat against the inner receptacle, or the bottom of the frying plate when used, rather than absorb the same.

As best shown in Figures 1 and 2, the lower receptacle is provided with handles consisting of metallic arms 44, secured at their lower ends to the side wall of the base, and having their upper ends cast into bars 45 formed of material of low heat conductivity. Attached to the outer wall of the shell 7, and extending over the bars 44, are composition handles 46, preferably notched to receive the bars and hold the shell and base in alinement, as well as to permit the shell and base to be handled independently, as well as a unit.

From the foregoing description of the accompanying drawings, it will be apparent that an exceedingly simple and efficient cooking device of attractive appearance has been devised, which may be easily converted without the exercise of skill, to perform various types of cooking, inasmuch as the parts are so designed as to render their proper method of assembly obvious and foolproof.

When it is desired to fry, only the plate 27 is employed, although the cover may be utilized on the base, if wanted. Likewise, the base itself may be used independently of the other elements in the manner of an ordinary hot-plate, for reception of various receptacles, toasters, and the like.

For baking, roasting, and other forms of cooking, the insulating shell and inner receptacle are utilized, and due to the retention of heat within the compartment 35 surrounding the inner receptacle 32, maximum efficiency is obtained. As explained, this is materially increased by the provision of a reflecting surface for the inner wall of the insulating shell, and while this is of no particular advantage in some styles of cooking, in baking or browning food within the inner receptacle 32, the vents or openings 36 reduce the time required, in that the heat passing through the openings will engage and heat the cover 37, thus eliminating condensation, the evaporation of which eventually reduces the temperature within the cooker, and if sufficient condensation occurs, the same will drip from the cover, having a basting effect upon the food, which is undesirable, and materially prolongs the period required in either baking or browning.

All of the parts are removable, which materially facilitates cleaning, and in addition to providing for replacement of the heating units, the quickly detachable connections between the same and the base also allow easy cleaning of the base and removal of crumbs and spilt food that would otherwise accumulate within the depressions 9 under the heating elements.

Due to the arrangement of the thermostat control with relation to the heating elements, the same is uniformly influenced by the heat from the elements in the use of the frying plate, or the inner receptacle and insulating shell, to accurately control the cooking temperatures in both instances.

I claim:

1. A portable electric cooking appliance comprising, a base, a quickly detachable flat heating element mounted horizontally on the top of said base, an insulating shell loosely seated on said base, and an inner receptacle supported upon said shell in spaced relation to the shell and base.

2. A portable electric cooking appliance comprising, a base, a heating element mounted on said base, prong and socket connections between said element and said base for quick detachability of the element, an insulating shell loosely seated upon said base, an inner receptacle supported upon said shell in spaced relation to the shell and base, and a cover for said receptacle.

3. A portable electric cooking appliance comprising, a base, flat heating elements mounted horizontally upon the top of said base, an insulating shell loosely seated upon said base and comprising spaced inner and outer walls with insulation material disposed between said walls, an inner receptacle supported upon said shell in spaced relation to the shell and base, and a cover for said receptacle.

4. A portable electric cooking appliance comprising, a base, a heating element mounted on said base, an insulating shell loosely seated upon said base, an inner receptacle having a flange supported on said base to space the receptacle from said shell and base and form a closed heating compartment surrounding the receptacle, and a cover for said receptacle on said flange.

5. A portable electric cooking appliance comprising, a hollow base provided on its upper face with a raised rib forming a peripheral shoulder, said rib serving as a support for a plate, an insulating shell loosely supported upon said shoulder, an inner receptacle having a flange engaging the top of said shell to support the receptacle in spaced relation to the inner wall of said shell and forming a heating compartment, a cover for said receptacle engaging said flange, an electrical heating element mounted on the upper face of said base, and a thermostat attached to the bottom face of the top of said base adjacent said heating element and influenced by the same to control temperature both in the use of said plate and said receptacle.

6. A portable electric cooking appliance comprising, a base, a heating element mounted upon said base, an insulating shell loosely seated upon said base surrounding said element, an inner receptacle provided with a flange at its upper edge for engaging the top edge of said shell and supporting the receptacle in spaced relation to the shell and said base to form a heating compartment surrounding said receptacle, said flange being provided with spaced openings, and a cover for said receptacle seated upon said flange exteriorly of said openings.

7. A portable electric cooking appliance comprising, a base, a heating element mounted on said base, a shell loosely seated on said base for supporting an inner receptacle, and alined rigid cooperating handles on said shell and base, said handles normally engaging each other to allow handling of the base and shell independently or as a unit.

8. A portable electric cooking appliance comprising, a hollow base consisting of upper and lower sections, means for detachably connecting the sections together, a heating element mounted on said base, a prong and socket connection between said element and base, a thermostat within said base and attached to the bottom face of the upper section adjacent said heating element for controlling the same, the top face of said base being provided with a raised rib forming a peripheral shoulder, said rib serving as a support for a cooking utensil, an insulating shell seated on said peripheral shoulder and comprising spaced inner and outer walls with insulating material disposed between said walls, the inner wall having a heat-reflecting surface, an inner receptacle provided with a flange at its upper edge adapted to seat on the upper edge of said shell to support the receptacle in spaced relation to said shell and base to form heating compartments surrounding said receptacle, said flange being provided with spaced openings, a cover for said receptacle engaging said flange exteriorly of said openings, and alined cooperating handles carried by said shell and base and normally engaging each other to allow the shell and base to be handled independently or as a unit.

ALVA T. SMITH.